United States Patent Office 3,074,979
Patented Jan. 22, 1963

3,074,979
3-MONO-OXIME DERIVATIVES OF C-4 UNSATURATED STEROIDS
George I. Poos, Ambler, Pa., and Lewis H. Sarett, Princeton, N.J., assignors to Merck & Co., Inc., Rahway, N.J., a corporation of New Jersey
No Drawing. Filed May 8, 1961, Ser. No. 108,243
24 Claims. (Cl. 260—397.45)

This invention is concerned generally with novel steroid compounds and with processes of preparing them. More particularly, it relates to novel 3-(mono-oximino substituted) - C-4 - unsaturated - 20-keto-17-hydroxy-11,21-bis-oxygenated-steroids of the pregnane series, and with processes of preparing these new compounds by reacting the corresponding $\Delta^4$ - 3,20 - diketo-17-hydroxy-11,21-bis-oxygenated-steroid with a hydroxylamine compound. These 3 - (mono-oximino substituted)-C-4-unsaturated-20-keto-17-hydroxy-11,21-bis-oxygenated-steroids as for example, 4-pregnene-17α,21-diol-3,11,20 - trione 3 - monoxime and 1,4-pregnadiene-17α,21-diol-3,11,20 - trione 3 - monoxime have been found to possess cortisone activity, whereas the corresponding 20-mono-oximes and 3,20-dioximes of 4-pregnene-17α,21-diol-3,11,20-trione possess no cortisone-activity whatsoever. Moreover, the 11β,21-bis-oxygenated-1,4-pregnadiene-17α-ol-3,20-dione 3 - monoximes (and their O-alkyl and O-alkanoyl derivatives), in addition to possessing cortisone-activity, do not possess any appreciable sodium or water retention action and are therefore substantially free of undesired side effects.

These novel 3-(mono-oximino substituted)-C-4-unsaturated-20-keto-17-hydroxy-11,21-bis-oxygenated-steroids of the pregnane series, subject of the present invention, may be chemically represented as follows:

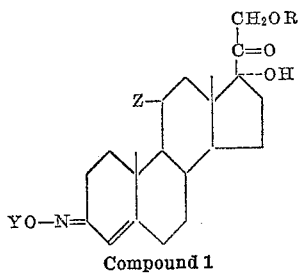

Compound 1

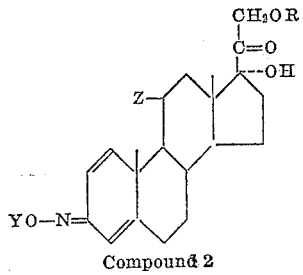

Compound 2 wherein R is hydrogen or acyl, Y is hydrogen, alkyl or alkanoyl, and Z is a keto or hydroxy radical.

These novel 3-(mono-oximino substituted)-C-4-unsaturated-20-keto-17-hydroxy-11,21-bis-oxygenated-steroids of the pregnane series and their O-alkyl derivatives, may be prepared by reacting the corresponding C-4 unsaturated 3,20-diketo-17-hydroxy-11,21-bis-oxygenated-steroid such as 11,21 - bis - oxygenated - 4-pregnene-17α-ol-3,20-dione (Compound 3 hereinbelow) and 11,21-bis-oxygenated-1,4-pregnadiene-17α-ol-3,20-dione (Compound 4 hereinbelow) with approximately one molecular equivalent of a hydroxylamine compound (Compound 5) such as hydroxylamine, an O-alkyl-hydroxylamine, etc., thereby forming the corresponding 3-(mono-oximino substituted)-11,21-bis-oxygenated-1,4-pregnadiene-17α - ol - 20 - one (Compound 7). The reactions indicated hereinabove may be chemically represented as follows:

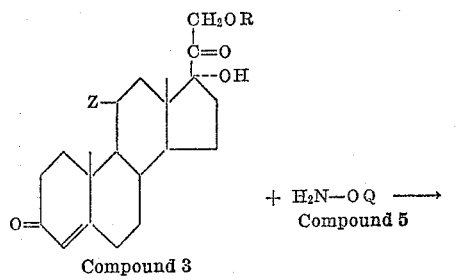

Compound 3   + H₂N—OQ ⟶
             Compound 5

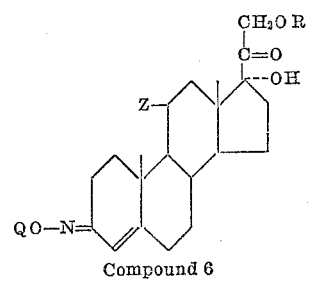

Compound 6

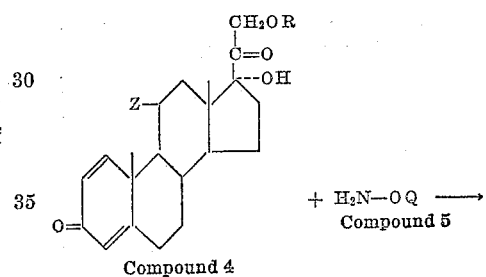

Compound 4   + H₂N—OQ ⟶
             Compound 5

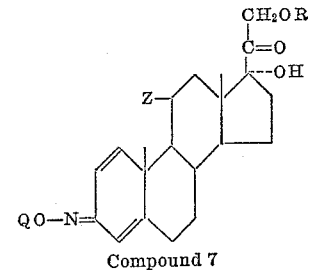

Compound 7 wherein Q is hydrogen or alkyl and R and Z have the significance above-defined.

The C - 4 - unsaturated 3-alkanoyloximino-20-keto-17-hydroxy-11,21-bis-oxygenated steroids of the pregnane series are prepared by reacting the corresponding 3-monoxime with an alkanoylating agent e.g., an alkanoic anhydride such as acetic anhydride, propionic anhydride, an alkanoyl halide, such as tertiary butyl-acetyl chloride, and the like.

The C-4 unsaturated 3,20-diketo-17-hydroxy-11,21-bis-oxygenated-steroids of the pregnane series utilized as starting materials in the presently invented process include 4-pregnene-11β,17α,21-triol-3,20-dione, 4-pregnene - 11β, 17α,21-triol-3,20-dione 21-(lower alkanoate), 4-pregnene-11β,17α,21-triol-3,20-dione 21-acetate, 4 - pregnene - 11β, 17α,21-triol-3,20-dione 21-(tertiary butyl-acetate), 4-pregnene-17α,21-diol-3,11,20-trione, 4 - pregnene-17α,21-diol-3,11,20-trione 21-(lower alkanoate), 4-pregnene-17α,21-diol-3,11,20-trione 21-acetate, 4-pregnene-17α,21-diol-3,11,20 - trione 21-propionate, 1,4-pregnadiene-11β, 17α,21-triol-3,20-dione, 1,4-pregnadiene-11β,17α,21-triol-3,20-dione 21-(lower alkanoate), 1,4-pregnadiene-11β, 17α,21-triol-3,20-dione 21-acetate, 1,4-pregnadiene-11β,17α,21-triol-3,20-dione 21-(tertiary butyl-acetate), 1,4-pregnadiene-17α,21-diol-3,11,20-trione, 1,4 - pregnadiene-17α,21-diol-3,11,20-trione 21-(lower alkanoate), 1,4-pregnadiene-17α,21-diol-3,11,20-trione 21-acetate, 1,4-pregnadiene-17α,21-diol-3,11,20-trione 21-propionate, and the like.

The hydroxylamine compounds used in the reaction include hydroxylamine, O-alkyl-hydroxylamines such as O - methyl - hydroxylamine, O - ethyl-hydroxylamine, O-propyl-hydroxylamine, and the like.

The reaction between the hydroxylamine compound and the C-4 unsaturated 3,20-diketo-17-11,21-bis-oxygenated-steroid of the pregnane series is conducted by bringing approximately equimolecular equivalents of these reactants together in a substantially anhydrous organic solvent as, for example, a lower alkanol, such as ethanol, methanol, or isopropanol, a tertiary amine such as pyridine, and the like. The hydroxylamine compound is conveniently incorporated into the reaction mixture in the form of a salt e.g., hydroxylamine hydrochloride, O-methyl-hydroxylamine hydrochloride, along with a molecular excess of a base such as an alkali metal acetate, e.g., sodium acetate, a tertiary amine, e.g., pyridine, and the like. The mixture of hydroxylamine compound (free base), C-4 unsaturated-3,20-diketo-17-hydroxy-11,21-bis-oxygenated-steroid, and organic solvent is allowed to stand at room temperature for about 12–60 hours, thereby forming the corresponding 3-(mono-oximino-substituted)-C-4 unsaturated-20-keto-17-hydroxy-11,21-bis-oxygenated-steroid. This 3-(mono-oximino-substituted) steroid compound is conveniently recovered by diluting the reaction mixture with ice water, and extracting the resulting aqueous mixture with a halogenated hydrocarbon solvent such as chloroform; this halogenated hydrocarbon extract is washed free of acidic and basic impurities, dried, evaporated to dryness, and the residual material is recrystallized from an organic solvent such as ethyl acetate, ethyl acetate-ether, ethyl acetate-acetone, etc. to give, in substantially pure form, the 3-(mono-oximino-substituted)-C-4 unsaturated-20-keto-17-hydroxy-11,21-bis-oxygenated-steroid of the pregnane series as, for example, 4-pregnene-11β,17α,21-triol-3,20-dione 3-monoxime, 4 - pregnene - 11β,17α,21 - triol-3,20-dione 3-monoxime 21-(lower alkanoate), 4-pregnene-11β,17α,21-triol-3,20-dione 3-monoxime 21-acetate, 4-pregnene-11β,17α,21-triol-3,20-dione 3-monoxime 21-(tertiary butyl-acetate), 4-pregnene-11β,17α,21-triol-3,20-dione 3-(O-alkyl-oxime), 4 - pregnene - 11β,17α,21 - triol - 3,20-dione 3-(O-alkyl-oxime) 21-(lower alkanoate), 4-pregnene-11β,17α,21-triol-3,20-dione 3-(O-methyl-oxime) 21-acetate, 4-pregnene-11β,17α,21-triol-3,20-dione 3-(O-ethyl-oxime) 21-propionate, 4-pregnene-17α,21-diol-3,11,20-trione 3-monoxime, 4-pregnene-17α,21-diol-3,11,20-trione 3-monoxime 21-(lower alkanoate), 4-pregnene-17α,21-diol-3,11,20-trione 3-monoxime 21-acetate, 4-pregnene-17α,21-diol-3,11,20-trione 3-monoxime 21-propionate, 4-pregnene-17α,21-diol-3,11,20-trione 3-monoxime 21-(tertiary butyl-acetate), 4-pregnene-17α,21-diol-3,11,20-trione 3(O-alkyl-oxime), 4-pregnene-17α,21-diol-3,11,20-trione 3-(O-alkyl-oxime) 21-(lower alkanoate), 4-pregnene-17α,21-diol-3,11,20-trione 3-(O-methyl-oxime) 21-acetate, 4-pregnene-17α,21-diol-3,11,20-trione 3-(O-ethyl-oxime) 21-butyrate, 1,4-pregnadiene-17α,21-diol-3,11,20-trione 3 - monoxime, 1,4-pregnadiene-17α,21-diol-3,11,20 - trione 3 - monoxime 21-(lower alkanoate), 1,4-pregnadiene-17α,21-diol-3,11,20-trione 3-monoxime 21-acetate, 1,4-pregnadiene-17α,21-diol-3,11,20-trione 3-monoxime 21-propionate, 1,4-pregnadiene-17α,21-diol-3,11,20-trione 3-monoxime 21-(tertiary butyl-acetate), 1,4-pregnadiene-17α,21-diol-3,11,20-trione 3-(O-alkyl-oxime) 21-(lower alkanoate), 1,4-pregnadiene-17α,21-diol-3,11,20-trione 3 - (O - methyl-oxime) 21-acetate, 1,4-pregnadiene-17α,21-diol-3,11,20-trione 3-(O-ethyl-oxime) 21-butyrate, 1,4-pregnadiene-11β,17α,21-triol-3,20-dione 3-monoxime, 1,4-pregnadiene-11β,17α, 21-triol-3,20-dione 3-monoxime 21-(lower alkanoate), 1,4-pregnadiene-11β,17α,21-triol-3,20-dione 3 - monoxime 21-acetate, 1,4-pregnadiene-11β,17α,21-triol-3,20-dione 3-monoxime 21-(tertiary butyl-acetate), 1,4-pregnadiene-11β,17α,21-triol-3,20-dione 3-(O-alkyl-oxime), 1,4-pregnadiene-11β,17α,21-triol-3,20-dione 3-(O-alkyl-oxime) 21-(lower alkanoate), 1,4-pregnadiene-11β,17α,21-triol-3,20-dione 3-(O-methyl-oxime) 21-acetate, 1,4-pregnadiene-11β,17α,21-triol-3,20-dione 3-(O-ethyl-oxime) 21-propionate, and the like.

Other 3 - (mono-oximino-substituted)-C-4-unsaturated-20-keto-17-hydroxy-11,21-bis-oxygenated-steroids of the pregnane series as, for example, the O-alkanoyl derivative of the foregoing 3-monoximes are conveniently prepared by reacting said 3-monoximes with an alkanoic anhydride such as acetic anhydride, propionic anhydride, an alkanoyl halide such as tertiary butyl-acetyl chloride and the like, in the presence of a tertiary amine such as pyridine, collidine, and the like, thereby forming 3-(alkanoyl-oximino)-4-pregnene-11β,17α,21-triol-20-one 21-alkanoate, 3-acetoximino-4-pregnene-11β,17α,21-triol-20-one 21-acetate, 3-(alkanoyl - oximino) - 4-pregnene-17α,21-diol-11,20-dione 21 - alkanoate, 3 - acetoximino-4-pregnene-17α,21-diol-11,20-dione 21-acetate, 3-(alkanoyl-oximino)-1,4-pregnadiene-17α,21-diol-11,20-dione 21-alkanoate, 3-acetoximino-1,4-pregnadiene-17α,21-diol-11,20 - dione 21 - acetate, 3-(alkanoyl-oximino)-1,4-pregnadiene-11β,17α,21-triol - 20-one 21-alkanoate, 3-acetoximino-1,4-pregnadiene-11β,17α,21-triol-20-one 21-acetate, and the like.

The following examples illustrate methods of carrying out the present invention, but it is to be understood that these examples are given for purposes of illustration and not of limitation.

*Example 1*

A suspension of 201 mg. of 4-pregnene-17α,21-diol-3,11,20-trione 21-acetate in 2 ml. of pyridine and 2 ml. of ethanol is warmed to effect solution and the solution is cooled to room temperature. 53 mg. of hydroxylamine hydrochloride is then added to the solution and the resulting mixture is allowed to stand at room temperature overnight. The reaction solution is diluted with ice water, and the crystalline product which precipitates is recovered by filtration, washed with water, dried and recrystallized from ethanol to give substantially pure 4-pregnene-17α,21-diol-3,11,20-trione 3-monoxime 21-acetate; M.P. 263–266° C. dec.

*Example 2*

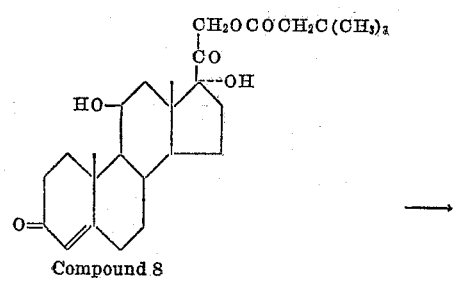

Compound 8

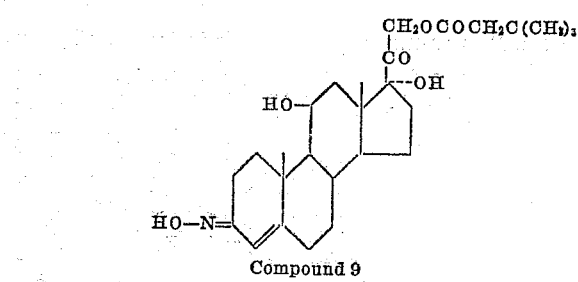

Compound 9

To a solution of 258 mg. of 4-pregnene-11β,17α,21-triol-3,20-dione 21-(tertiary butyl-acetate) in 2.5 ml. of pyridine and 2.5 ml. of ethanol is added 53 mg. of hydroxylamine hydrochloride, and the resulting solution is allowed to stand at room temperature for 23 hours. The reaction mixture is diluted with ice water, and the crystals which separate are collected, washed with water, dried, and recrystallized from ethanol, benzene and ethyl acetate to give substantially pure 4-pregnene-11β,17α,21-triol-3,20-dione 3-monoxime 21-(tertiary butyl-acetate); M.P. 237–239° C.

Example 3

A mixture of 500 mg. or 4-pregnene-11β,17α,21-triol-3,20-dione 21-acetate, 5 ml. of pyridine and 115 mg. of hydroxylamine hydrochloride is maintained at room temperature for 65 hours. Ice and water is added to the reaction mixture and the resulting aqueous mixture is extracted with chloroform. The chloroform extract is dried and evaporated to dryness under vacuum. The residual material is crystallized from ethylacetate-ether, and the crystalline product thus obtained is recrystallized from ethylacetate-ethanol to give substantially pure 4-pregnene-11β,17α,21-triol-3,20-dione 3-monoxime 21-acetate; M.P. 227–229° C. dec.

Example 4

402 mg. of 4-pregnene-17α,21-diol-3,11,20-trione 21-acetate (1 mmole) and 95 mg. O-methyl hydroxylamine hydrochloride (1.14 mmoles) are dissolved in 2 ml. of pyridine, and the resulting solution is maintained at room temperature for a period of approximately 22.5 hours. The reaction mixture, containing precipitated pyridine hydrochloride, is diluted with ice water, and the crystalline product which separates is recovered by filtration, washed with water, dried, and recrystallized from ethyl acetate to give substantially pure 4-pregnene-17α,21-diol-3,11,20-trione 3-(O-methyl-oxime) 21-acetate; M.P. 205–209° C.

Example 5

To a solution of 411 mg. of 4-pregnene-17α,21-diol-3,11,20-trione 3-monoxime 21-acetate in 5 ml. of pyridine is added 2.5 ml. of acetic anhydride and the resulting solution is heated at about 100° C. for approximately 20 minutes. The reaction mixture is cooled, diluted with ice water, and the aqueous mixture thus obtained is extracted three times with chloroform. The chloroform extract is washed with dilute aqueous sodium bicarbonate solution, with dilute aqueous hydrochloric acid, and with water, and is then dried and evaporated to dryness in vacuo. The residual material is crystallized from ethyl acetate-ether and is then recrystallized from acetone-ether-petroleum ether to give substantially pure 3-acetoximino-4-pregnene-17α,21-diol-11,20-dione 21-acetate; M.P. 178–185° C. dec.

Example 6

To a solution of 400 mg. (1 mmole) of 1,4-pregnadiene-17α,21-diol-3,11,20-trione 21-acetate in 1.8 ml. of pyridine is added 80 mg. (1.15 mmoles) of hydroxylamine hydrochloride. After 27 hours at room temperature, the reaction mixture is diluted with ice water, and the crystalline material which precipitates is recovered by filtration, washed, dried, and recrystallized from ethyl acetate to give substantially pure 1,4-pregnadiene-17α,21-diol-3,11,20-trione 3-monoxime 21-acetate; M.P. 235–238° C.

Example 7

A mixture of 400 mg. of 1,4-pregnadiene-17α,21-diol-3,11,20-trione 21-acetate (1 mmole), 95 mg. of O-methyl-hydroxylamine hydrochloride (1.14 mmoles) and 3 ml. of pyridine is maintained at room temperature for approximately 23 hours. The reaction mixture is diluted with ice water, and the resulting aqueous mixture is extracted with chloroform. The chloroform extract is washed with dilute aqueous sodium bicarbonate solution, with dilute aqueous hydrochloric acid, and with water, and dried. The chloroform is evaporated from the resulting washed and dried extract, and the residual material is crystallized from ethyl acetate-ether followed by recrystallization from acetone-ether to give substantially pure 1,4-pregnadiene-17α,21-diol-3,11,20-trione 3-(O-methyl-oxime) 21-acetate; M.P. 210–215° C.

Example 8

To a solution of 305 mg. of 1,4-pregnadiene-17α,21-diol-3,11,20-trione 3-monoxime 21-acetate in 1.5 ml. of pyridine is added 1.0 ml. of acetic anhydride, and the resulting mixture is heated at 100° C. for 15 minutes. The reaction mixture is cooled and the cooled mixture is quenched with ice water. The crystalline material which separates is recovered by filtration, washed, dried, and recrystallized from ethyl acetate and acetone to give substantially pure 3-acetoximino-1,4-pregnadiene-17α,21-diol-11,20-dione 21-acetate; M.P. 242–247° C.

Various changes and modifications may be made in carrying out the present invention without departing from the spirit and scope thereof. Insofar as these changes and modifications are within the purview of the annexed claims, they are to be considered as part of our invention.

We claim:

1. 3-(mono-oximino-substituted) - C - 4 - unsaturated-20-keto-17-hydroxy-11,21-bis-oxygenated steroids of the pregnane series, having unsaturation in the A-ring selected from the group consisting of C-4 unsaturation and C-1:C-4 unsaturation.

2. 3-(mono - oximino - substituted)-4-pregnene-17α,21-diol-11,20-dione.

3. 4-pregnene-17α,21-diol-3,11,20-trione 3-monoxime.

4. 4-pregnene-17α,21-diol - 3,11,20 - trione 3-(O-alkyl-oxime) 21-(lower alkanoate).

5. 3-(mono-oximino-substituted) - 4 - pregnene - 11β,17α,21-triol-20-one.

6. 4-pregnene-11β,17α,21-triol-3,20-dione 3-monoxime.

7. 4-pregnene-11β,17α,21-triol-3,20-dione 3-monoxime 21-(lower alkanoate).

8. 4-pregnene-11β,17α,21-triol-3,20-dione 3-monoxime 21-(tertiary butyl-acetate).

9. 4-pregnene-11β,17α,21-triol - 3,20 - dione 3-(O-alkyl-oxime) 21-(lower alkanoate).

10. 3-(alkanoyl-oximino) - 4 - pregnene - 11β,17α,21-triol-20-one 21-(lower alkanoate).

11. 3-(mono - oximino - substituted)-1,4-pregnadiene-17α,21-diol-11,20-dione.

12. 1,4-pregnadiene-17α,21-diol-3,11,20-trione 3 - monoxime.

13. 1,4-pregnadiene-17α,21-diol-3,11,20-trione 3-(O-alkyl-oxime) 21-(lower alkanoate).

14. 3-(mono-oximino-substituted) - 1,4 - pregnadiene-11β,17α,21-triol-20-one.

15. 1,4-pregnadiene-11β,17α,21-triol-3,20-dione 3-monoxime.

16. 1,4-pregnadiene-11β,17α,21-triol-3,20-dione 3-monoxime 21-(lower alkanoate).

17. 1,4-pregnadiene-11β,17α,21-triol-3,20-dione 3-monoxime 21-(tertiary butyl-acetate).

18. 1,4 - pregnadiene - 11β,17α,21 - triol - 3,20 - dione 3-(O-alkyl-oxime) 21-(lower alkanoate).

19. 3-(alkanoyl-oximino) - 1,4 - pregnadiene-11β,17α,21-triol-20-one 21-(lower alkanoate).

20. The process which comprises reacting a C-4 unsaturated - 3,20 - diketo-17-hydroxy-11,21-bis-oxygenated steroid of the pregnane series with approximately one molecular equivalent of a hydroxylamine compound thereby forming the corresponding 3-(mono-oximino-substituted)-C-4-unsaturated - 20 - keto-17-hydroxy-11,21-bis-oxygenated-steroid.

21. The process which comprises reacting 4-pregnene-17α,21-diol-3,11,20-trione 21-alkanoate with approximately one molecular equivalent of hydroxylamine to produce 4-pregnene-17α,21-diol-3,11,20-trione 3-monoxime 21-alkanoate.

22. The process which comprises reacting 1,4-pregnadiene-17α,21-diol-3,11,20-trione 21-alkanoate with approximately one molecular equivalent of hydroxylamine to produce 1,4-pregnadiene - 17α,21 - diol-3,11,20-trione 3-monoxime 21-alkanoate.

23. The process which comprises reacting 4-pregnene-11β,17α,21-triol-3,20-dione 21-alkanoate with approximately one molecular equivalent of hydroxylamine to produce 4-pregnene-11β,17α,21-triol-3,20-dione 3-monoxime 21-alkanoate.

24. The process which comprises reacting 1,4-pregnadiene-11β,17α,21-triol-3,20-dione 21-alkanoate with approximately one molecular equivalent of hydroxylamine to produce 1,4 - pregnadiene - 11β,17α,21-triol-3,20-dione 3-monoxime 21-alkanoate.

References Cited in the file of this patent

UNITED STATES PATENTS

| | | |
|---|---|---|
| 2,335,616 | Tendick et al. | Nov. 30, 1943 |
| 2,628,966 | Graber et al. | Feb. 17, 1953 |
| 2,949,405 | Wettstein et al. | Aug. 16, 1960 |
| 2,958,702 | Taub et al. | Nov. 1, 1960 |